(12) United States Patent
Al-Dossary et al.

(10) Patent No.: US 10,458,206 B2
(45) Date of Patent: Oct. 29, 2019

(54) CHOKE SYSTEM FOR WELLHEAD ASSEMBLY HAVING A TURBINE GENERATOR

(71) Applicant: Saudi Arabian Oil Company, Dhahran (SA)

(72) Inventors: Faisal M. Al-Dossary, Juaymah (SA); Mohammed S. Al-Zahrani, Dammam (SA)

(73) Assignee: Saudi Arabian Oil Company (SA)

( * ) Notice: Subject to any disclaimer, the term of this patent is extended or adjusted under 35 U.S.C. 154(b) by 353 days.

(21) Appl. No.: 15/286,707

(22) Filed: Oct. 6, 2016

(65) Prior Publication Data

US 2018/0100374 A1 Apr. 12, 2018

(51) Int. Cl.
| | |
|---|---|
| *E21B 41/00* | (2006.01) |
| *H02P 3/04* | (2006.01) |
| *F01D 21/00* | (2006.01) |
| *E21B 33/03* | (2006.01) |
| *E21B 34/02* | (2006.01) |
| *E21B 47/06* | (2012.01) |
| *E21B 43/12* | (2006.01) |

(52) U.S. Cl.
CPC .......... *E21B 41/0085* (2013.01); *E21B 33/03* (2013.01); *E21B 34/02* (2013.01); *E21B 43/12* (2013.01); *E21B 47/06* (2013.01); *F01D 21/006* (2013.01); *H02P 3/04* (2013.01); *F05B 2220/602* (2013.01)

(58) Field of Classification Search
CPC ..... E21B 34/02; G05D 7/0635; F03D 7/0248; H02P 3/04

USPC ........................................................ 166/91.1
See application file for complete search history.

(56) References Cited

U.S. PATENT DOCUMENTS 1,946,182 A * 2/1934 Thompson ................ F02C 1/02
 415/145
3,075,743 A * 1/1963 Sheets ..................... F01D 5/142
 415/199.4

(Continued)

FOREIGN PATENT DOCUMENTS

| CA | 2369574 A1 | 7/2003 |
| WO | WO2010090530 A1 | 8/2010 |
| WO | WO2013130057 A1 | 9/2013 |

OTHER PUBLICATIONS

Dictionary definition of "generator", accessed Oct. 26, 2018 via dictionary.com.*

(Continued)

*Primary Examiner* — Blake E Michener
(74) *Attorney, Agent, or Firm* — Bracewell LLP; Constance G. Rhebergen

(57) ABSTRACT

A wellhead assembly for use with a well that includes a production tree, a production line for carrying produced fluid from the production tree, and a choke in the production line. The choke assembly includes a turbine member that rotates in response to fluid flowing through the production line. The kinetic energy of the rotating turbine is converted into electricity by a generator that is coupled with the turbine member. Selectively impeding turbine rotation with a brake system introduces a pressure drop in the production line fluid, and which regulates flow of the production line fluid. The turbine member can be disposed in a straight run of the production line, or adjacent a bend in the production line.

19 Claims, 3 Drawing Sheets

(56) References Cited

U.S. PATENT DOCUMENTS

| | | | |
|---|---|---|---|
| 4,369,373 A | | 1/1983 | Wiseman |
| 4,488,055 A | * | 12/1984 | Toyama ................. F03B 13/08 290/42 |
| 4,734,892 A | | 3/1988 | Kotlyar |
| 4,809,510 A | * | 3/1989 | Gaspard ................. F03B 13/00 290/52 |
| 5,254,528 A | * | 10/1993 | Takahata ............... H02K 49/00 188/164 |
| 5,839,508 A | * | 11/1998 | Tubel ................. E21B 41/0085 166/65.1 |
| 6,279,651 B1 | | 8/2001 | Schwendemann et al. |
| 6,554,074 B2 | | 4/2003 | Longbottom |
| 6,717,283 B2 | | 4/2004 | Skinner et al. |
| 6,998,724 B2 | | 2/2006 | Johansen et al. |
| 7,579,703 B2 | * | 8/2009 | Shifrin ................. F03B 13/105 290/52 |
| 7,702,423 B2 | | 4/2010 | Steiner et al. |
| 7,959,411 B2 | * | 6/2011 | Schlabach ............... F03B 13/00 416/227 A |
| 8,348,623 B2 | * | 1/2013 | Vasshus .................... F03B 7/00 137/14 |
| 8,680,704 B1 | | 3/2014 | Rooney |
| 8,985,967 B2 | * | 3/2015 | Gudivada ............. F04D 13/043 415/1 |
| 9,077,220 B2 | * | 7/2015 | Kyle ........................ F17D 1/02 |
| 9,083,213 B1 | * | 7/2015 | Caliz .................. E21B 41/0085 |
| 2002/0108822 A1 | * | 8/2002 | Klode ....................... B60L 7/00 188/161 |
| 2002/0189815 A1 | | 12/2002 | Johnson et al. |
| 2005/0179263 A1 | | 8/2005 | Johansen et al. |
| 2006/0105646 A1 | * | 5/2006 | Webster ................. B63H 11/08 440/47 |
| 2006/0169550 A1 | * | 8/2006 | Albrecht ................. F16D 55/02 188/161 |
| 2007/0279815 A1 | * | 12/2007 | Li ......................... F03D 7/0248 361/54 |
| 2011/0127131 A1 | * | 6/2011 | Simons .................. F16D 49/00 188/77 R |
| 2011/0135465 A1 | * | 6/2011 | Braicks ................. F03D 7/0248 416/1 |
| 2012/0031518 A1 | * | 2/2012 | Smith ..................... F03B 13/00 138/108 |
| 2012/0045335 A1 | * | 2/2012 | Heidenreich ........... F03D 15/10 416/170 R |
| 2012/0187683 A1 | * | 7/2012 | Wohlleb ................ F03D 7/0248 290/44 |
| 2012/0292909 A1 | * | 11/2012 | Eriksen ............... E21B 41/0085 290/52 |
| 2013/0056314 A1 | * | 3/2013 | Diaz De Cerio Garcia De Mendaza .............. F03D 7/0248 188/71.1 |
| 2013/0153242 A1 | | 6/2013 | Flight et al. |
| 2014/0001756 A1 | * | 1/2014 | Panosyan ............. H02K 49/046 290/7 |
| 2014/0044543 A1 | * | 2/2014 | Jokela ..................... F03B 3/126 416/128 |
| 2015/0090461 A1 | | 4/2015 | Carrascal et al. |
| 2015/0345260 A1 | | 12/2015 | Green et al. |
| 2016/0108699 A1 | | 4/2016 | Martino et al. |
| 2016/0116072 A1 | | 4/2016 | Westwater |

OTHER PUBLICATIONS

Idachaba, Francis, et al. "Renewable Power Supply Option for Smart Fields Implementation in Oil and Gas Production Installations in the Niger Delta." Nigeria Annual International Conference and Exhibition. Society of Petroleum Engineers, 163012, 2012. (pp. 1-5).

Idachaba, Francis. "Design of an Inline Power Generating System for Remote Oil and Gas Production Installation." Abu Dhabi International Petroleum Conference and Exhibition. Society of Petroleum Engineers, 162433, 2012. (pp. 1-4).

Xiao, Jinjiang X., et al. "Well Site Energy Harvesting from High-Pressure Gas Production." Saudi Aramco Journal of Technology (2014). (pp. 1-5).

International Search Report and Written Opinion for related PCT application PCT/US2017/055591 dated Dec. 6, 2017.

* cited by examiner

CHOKE SYSTEM FOR WELLHEAD ASSEMBLY HAVING A TURBINE GENERATOR

BACKGROUND OF THE INVENTION

1. Field of Invention

The present disclosure relates to a wellhead assembly for producing fluid from a subterranean formation. More specifically, the present disclosure relates to a choke system for regulating fluid flowing from a wellhead assembly, and that converts kinetic energy of the flowing fluid into electricity.

2. Description of Prior Art

To produce hydrocarbons from subterranean formations, wellbores are formed into the formations that provide a path for delivering the hydrocarbons to surface. The wellbores are generally lined with one or more strings of casing, where cement is usually injected into an annulus between the outermost casing string and wellbore walls. The cement adheres the casing to the wellbore walls, and also is intended to block flow axially through the annulus. Perforations are typically formed radially through the casing, cement, and into the surrounding formation. Hydrocarbons in the formation enter the wellbore and the casing through the perforations. Production tubing with isolation packers are often inserted into the casing, where the packers fill the annular space between the tubing and casing to divert hydrocarbon flow into the tubing.

A wellhead assembly is typically disposed on surface and at an opening of the wellbore. Upper ends of the casing and production strings normally connect to the wellhead assembly, and which support the strings in the wellbore. Included with most wellhead assemblies is a production tree, which is in fluid communication with the tubing in the wellbore. The fluid flows from the production to a facility for processing and/or refining in production piping that is attached to the production tree. Often choke devices are included in the production piping for regulating the pressure and flow rate of fluids flowing from the wellhead assembly so that the produced fluid is maintained at a designated pressure and flowrate.

SUMMARY OF THE INVENTION

Disclosed herein is an example of a wellhead assembly for producing fluid from a wellbore, and which includes a production tree, production piping connected to the production tree, and a choke assembly. In this example choke assembly is made up of a housing having a chamber that is in fluid communication with the production piping, a braking system, and a turbine element in the housing that rotates in response to a flow of fluid from the production piping through the housing, that is changeable between a freely rotating configuration to a rotationally impeded configuration when in braking engagement with the braking system, so that a pressure drop across the turbine element in the flow of fluid regulates the flow of fluid in the production piping. The wellhead assembly can further include a generator coupled with the turbine element. An electrical load can be included that is in electrical communication with the generator. Examples of the electrical load include a light, a gauge, a detector, and a flowmeter. The shaft can couple the turbine element with the braking system. In one example, the braking system can have calipers that are in selective retarding contact with the shaft, or can be a magnet that strategically forms a magnetic field to selectively impede rotation of the shaft and the turbine element. In an embodiment, the braking system can be responsive to pressure in the production piping. A pressure sensor can be included that is in pressure communication with the production piping at a location downstream of the choke assembly, and which is in signal communication with the braking system. In an alternative, the turbine member includes a hub that is generally coaxial with the production piping and turbine elements that project radially outward from the hub. An alternate embodiment of the turbine member has spaced apart hubs that are each arranged generally perpendicular with an axis of the production piping, and turbine elements that each span between the hubs and along helical paths.

Also described herein is an example of a method of producing fluid from a wellbore that involves directing fluid produced from the wellbore through production piping that is attached to a production tree, and across a turbine member that is rotatable in response to fluid flow, monitoring conditions in the production piping, and regulating fluid flow through the production piping by selectively impeding rotation of the turbine member in response to conditions monitored in the production piping. In an example, impeding rotation of the turbine member increases a pressure drop in fluid flowing past the turbine member. The method can further include converting kinetic energy in the rotating turbine member to electricity, and powering devices adjacent an opening of the wellbore with the electricity. Conditions monitored in the production piping can include fluid pressure which is measured downstream of the turbine member.

One example of a choke assembly for regulating flow from a wellbore is described herein and which is made up of a housing having a chamber that receives a flow of fluid from the wellbore and a turbine member in the chamber that rotates in response to the flow of fluid in the chamber, and that selectively resists rotation in response to conditions of the flow of fluid to regulate the flow of fluid flowing through the chamber. The choke assembly can include a generator coupled with the turbine member and that generates electricity in response to rotation of the turbine member. In an embodiment, rotation of the turbine member is selectively resisted by a brake system that is coupled with the turbine member. The choke assembly can further include a pressure sensor in production piping downstream of the chamber and that is in communication with the brake system. Optionally included with the choke assembly is a generator and a brake system that are coupled to a shaft, wherein the shaft is in an orientation that is coaxial with the production piping and perpendicular to the production piping. A generator and brake system can be included that are coupled with the turbine member, and wherein electricity is generated by the generator which is used to power the brake system to impede rotation of the turbine member.

BRIEF DESCRIPTION OF DRAWINGS

Some of the features and benefits of the present invention having been stated, others will become apparent as the description proceeds when taken in conjunction with the accompanying drawings, in which.

Figure 1:
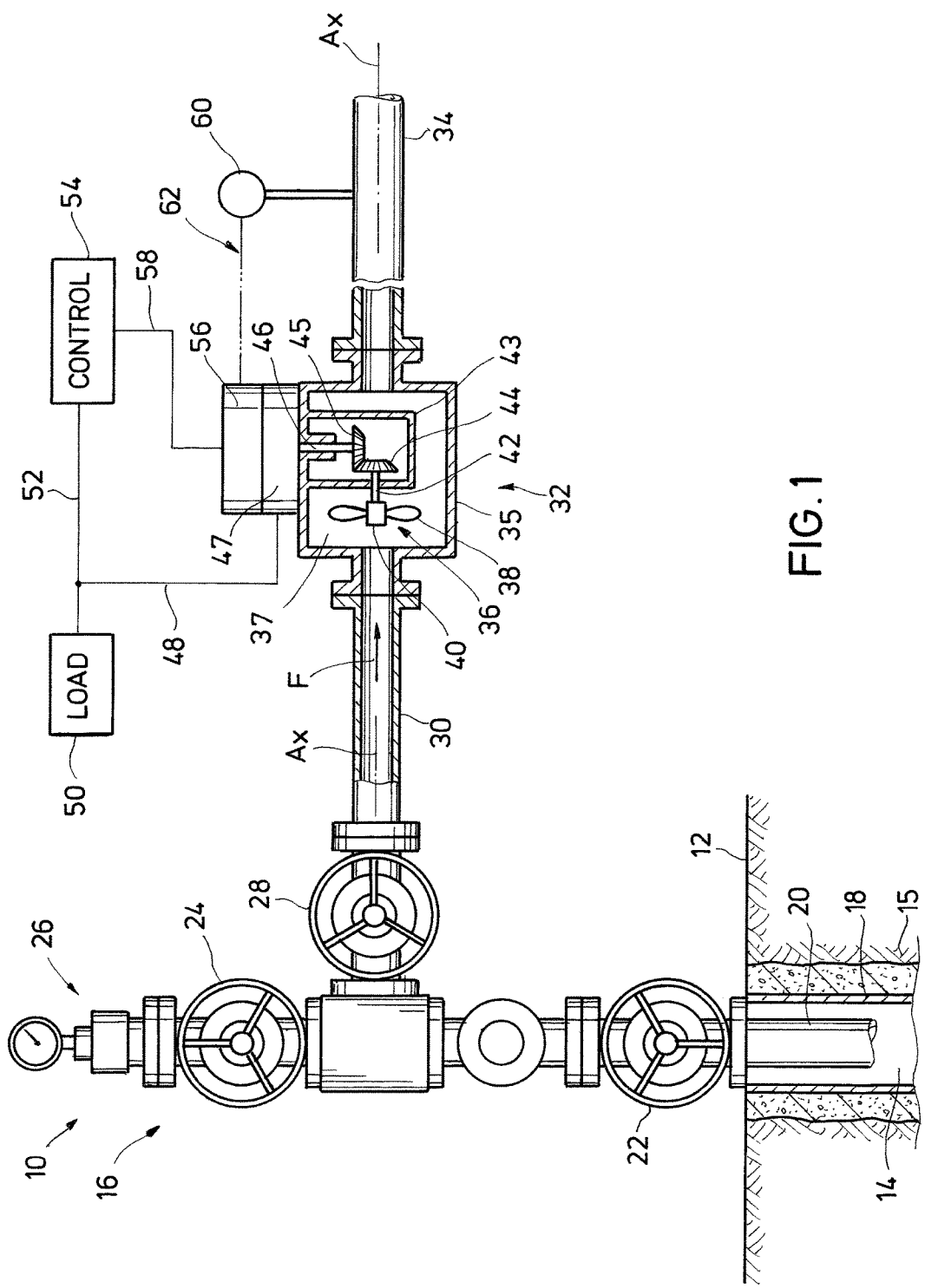
FIG. 1 is a side partial sectional view of a wellhead assembly equipped with a production line that includes a choke assembly.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

One example of a wellhead assembly 10 is shown in a partial side sectional view in FIG. 1. In this example, wellhead assembly 10 is mounted on surface 12 and over a wellbore 14 that intersects a subterranean formation 15. Included in the wellhead assembly 10 is a production tree 16 for controlling connate fluid produced from the formation 15. Casing 18 is shown depending into wellbore 14 downward from a lower end of wellhead assembly 10 and which lines the wellbore 14. Tubing 20 is inserted within casing 18 and also is supported its upper end within wellhead assembly 10. Production tubing 20 provides a conduit for delivering the connate fluid to the wellhead assembly 10. A master valve 22 is shown provided on a portion of production tree 16 proximate to surface 12, which can selectively be opened and closed to allow access into tubing 20 through production tree 16. A swab valve 24 is also included on production tree 16 proximate its upper end, opening and closing swab valve 24 allows selective access to a main bore (not shown) within production tree 16 from above production tree 16. A tree cap 26 with gauge is shown mounted on an upper end of production tree 16 and above swab valve 24. Production tree 16 also includes a wing valve 28 illustrated coupled between a mid-portion of production tree 16 and a production line 30 that extends laterally from production tree 16. Attached to an end of production line 30 opposite from production line 30 is an example of a choke assembly 32. As described in more detail below, choke assembly 32 provides a unique way of regulating fluid flow through the production line 30. On an end of choke assembly 32 opposite from production line 30 is a production line 34, in which one example transmits production fluid from wellhead assembly 10 to remote sites for storage and/or processing.

In the illustrated example choke assembly 32 includes a housing 35, and a turbine member 36; where turbine member 36 is disposed in a chamber 37 formed in housing 35. Turbine member 36 is selectively rotatable in response to a flow of fluid F flowing through production line 30 and into chamber 37. In the example of FIG. 1, a number of turbine elements 38 are provided with turbine member 36 and that are strategically formed to impart a rotational force onto turbine member 36 in response to the flow of fluid F, thereby causing turbine member 36 to rotate. The turbine elements 38 each project radially outward from a hub 40; in one example hub 40 is generally coaxial with an axis $A_X$ of production line 30. A shaft 42 is shown inserted into hub 40; turbine element 36 mounts to shaft 42 via a coupling between hub 40 and shaft 42 so that shaft 42 rotates with rotation of turbine element 36.

In the example of FIG. 1 production lines 30, 34 are generally aligned with one another so that the path of the flow of fluid F through chamber 37 is substantially unchanged. Supporting the shaft 42 and turbine member 36 in the flow of fluid F is a transmission system 43 shown depending into chamber 37 from an inner surface of housing 35, and between where housing 35 connects to lines 30, 34. In the transmission system 43 a rotational axis of the kinetic energy of the rotating turbine member 36 is changed from an orientation that is substantially parallel with axis $A_X$ to one that is substantially perpendicular with axis $A_X$. More specifically, an end of shaft 42 disposed within transmission system 43 includes a gear 44 that meshes with a gear 45, where gears 44, 45 are disposed in planes that are substantially perpendicular to one another. Moreover, the outer peripheral ends of gears 44, 45 are set adjoining one another so that teeth on the ends of the gears 44, 45 intermesh. Thus rotating gear 44, such as in response to rotation of shaft 42, causes gear 45 to rotate about its axis.

An end of a shaft 46 coaxially inserts into gear 45, where an end of shaft 46 distal from gear 45 is coupled to a generator 47 shown mounted outside of housing 35. In an example, generator 47 produces electricity from the kinetic energy of the rotating shaft 46, and thus that of turbine member 36. A line 48 is shown extending from an output end of generator 47 to a load 50, which thereby provides electricity from generator 47 to load 50. In one example, load 50 represents one or more devices that consume electricity and are adjacent the wellhead assembly 10. Examples of the devices within load element 50 include lighting, sensors, gauges, detectors, and flow meters. Another line 52 is shown connected between line 48 and a controller 54; line 52 thus provides communication between generator 47 and load element 50 to controller 54. In one example, controller 54 provides signals to generator 47 and/or load element 50, based upon the amount of electricity produced by generator 47.

A brake system 56 is shown mounted adjacent to generator 47. Processing hardware and software for controlling operation of the brake system 56 can be provided in brake system 56, in controller 54, or another information handling system. Brake system 56 is coupled with shaft 46, and may selectively provide resistance onto shaft 46, thereby impeding or retarding the rotation of turbine member 36. Line 58 is shown connected between controller 54 and brake system 56, and through which communication between controller 54 and brake system 56 may occur. In one example of operation, a sensor 60 is shown mounted onto production line 34 and which senses conditions within production line 34, such as pressure, temperature, fluid flowrate, and the like. A communication line 62 provides communication between sensor 60 and brake system 56, and also controller 54. Accordingly, based on feedback of conditions monitored by sensor 60 downstream of choke assembly 32, the brake system 56 can be activated to partially or fully restrict rotation of the turbine member 36 via its coupling with shaft 46. Because a pressure drop of the flow of fluid F across turbine member 36 when its rotation is restricted is greater than a pressure drop across the turbine member 36 when it is rotating freely in the flow of fluid F, the flow of fluid F downstream of the choke assembly 32 can be regulated or controlled by restricting rotation of the turbine member 36.

Figure 2:
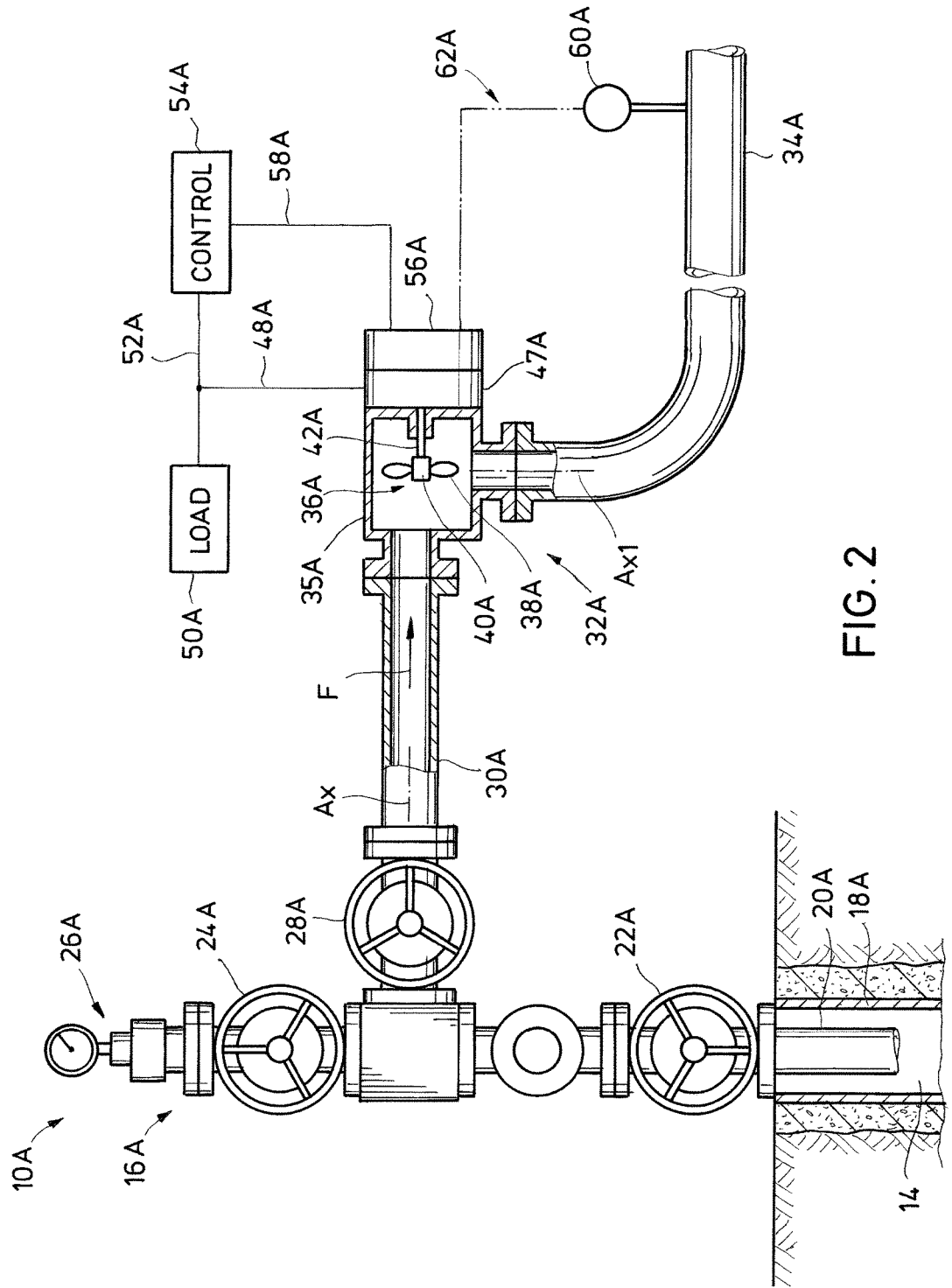
FIG. 2 is a side partial sectional view of an alternate example of the wellhead assembly of FIG. 1.

Shown in FIG. 2 is an alternate example of wellhead assembly 10A. In this example, a portion of production line 34A that couples to housing 35A has an axis $A_{X1}$ that is generally perpendicular with axis $A_X$ of production line 38A. Further shown in FIG. 2, is that the turbine member 36A is oriented so that its hub 40A and shaft 42A are substantially coaxial with axis $A_X$. Generator 47A and brake system 56A of FIG. 2 are on a side of housing 35A opposite from where housing 35A connects to production line 30A. The location of generator 47A and brake system 56A in FIG. 2 allows shaft 42A to directly couple with generator 47A and brake system 56A. Similarly, controller 54A connects to brake system 56A via line 58A and to generator 47A via lines 48A, 52A. Line 48A connects generator 47A to load element 50A so that by rotation of turbine element 36A, electricity can be generated for powering the devices that are a part of or make up load element 58. Also, sensor 60A mounts onto production line 34A downstream from assembly 32A which selectively provides feedback based on sensed conditions in the flow of fluid F that can be used for regulating flow of fluid F through choke assembly 32A.

Figure 3:
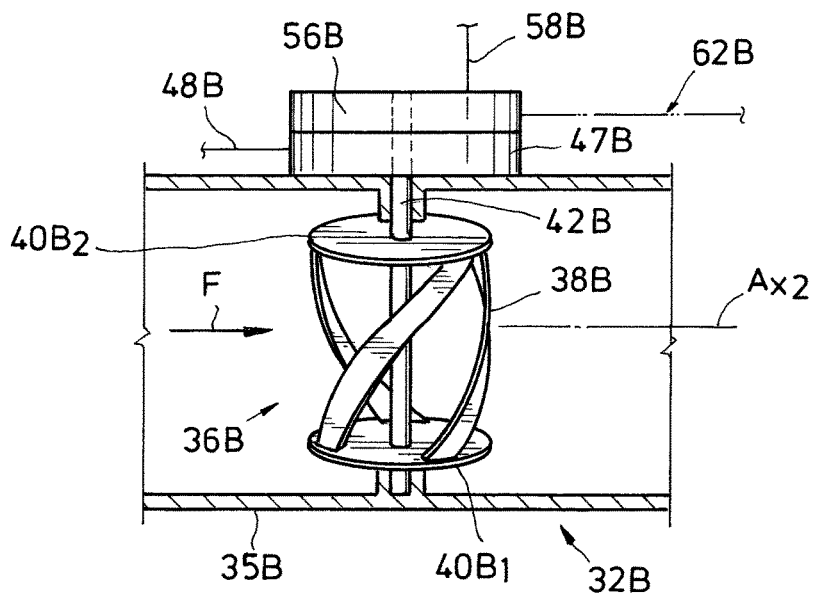
FIG. 3 is a side perspective view of an alternate example of a turbine member for use with the wellhead assembly of FIGS. 1 and 2.

FIG. 3 provides a side perspective view of an alternate example of a turbine member 36B, wherein turbine member 36B includes a pair of spaced apart hubs $40B_1$, $40B_2$. Hubs $40B_1$, $40B_2$ as shown are planar disk like members, and which are positioned at different radial positions in housing 35B. Hubs $40B_1$, $40B_2$ have an axis that is generally perpendicular with axis $A_{X2}$ of housing 35B. Turbine member 36B includes turbine elements 38B that extend between hubs $40B_1$, $40B_2$, and which are generally elongate members. The width of each turbine elements 38B is greater than its thickness. Additionally, the elongate lengths of the turbine elements 38B project along a generally helical paths between the hubs $40B_1$, $40B_2$. Hubs $40B_1$, $40B_2$ mount to a shaft 42B that projects through the housing 35B and is generally perpendicular to axis $A_{X2}$. Shaft 42B is coupled with generator 47B, and brake system 56B. Thus the choke assembly 32B of FIG. 3 can thereby generate electricity similar to that of the embodiments of FIGS. 1 and 2, and also can be braked or retarded in order to increase a pressure drop of the flow of fluid F flowing through housing 35B.

Figure 4:
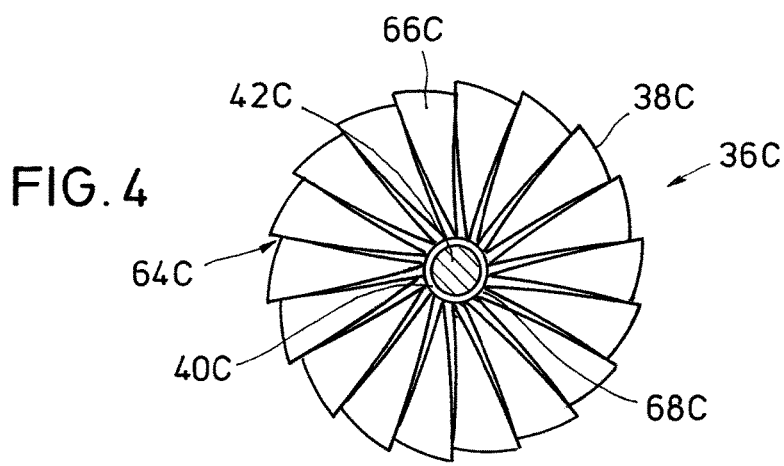
FIG. 4 is an axial view of an alternate example of the turbine member of FIG. 3.

FIG. 4 shows in an axial view another example of a turbine member 36C and where gaps 64C are provided between adjacent turbine elements 38C. In this example, the gaps 64C project radially outward from a hub 40C and along a path generally parallel with the turbine elements 38C. Here, hub 40C mounts onto shaft 42C. Thus, turbine element 36C can be used in the examples of wellhead assemblies 10, 10A of FIG. 1 or 2. As shown, the outer ends 66C of the turbine elements 38C have widths that are greater than widths of the elements 38C on the inner end 68C which are approximate the hub 40C. Further, the surfaces of the turbine elements 38C along paths there are generally oblique to an axis of shaft 40C.

Figures 5A, 5B:
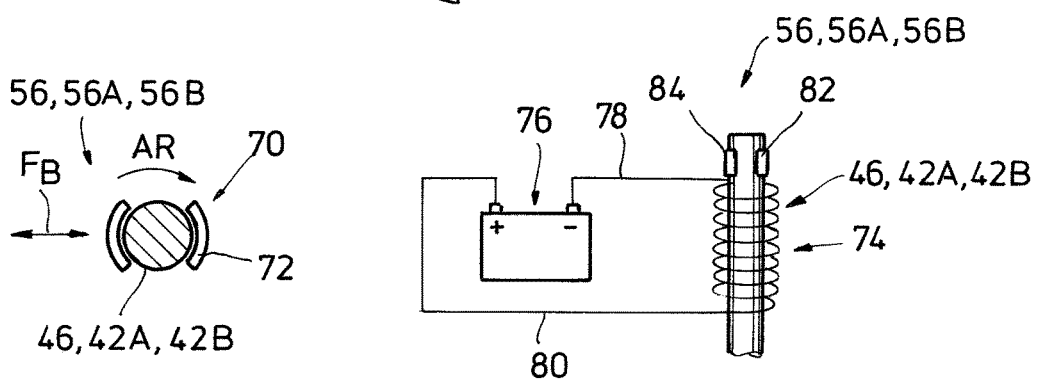
FIG. 5A is an axial view of an example of a braking system for use with the choke assembly of FIG. 1.
FIG. 5B is a side view of an alternate example of a braking system for use with the choke assembly of FIG. 1.

FIG. 5A shows in an axial view one example of a caliper system 70 that is part of the brake system 56, 56A of FIGS. 1, 2. Here, pads 72 electively exert a force $F_B$ onto shaft 46, 42A, 42B, which in one example is in response to signals received from sensor 60 (FIG. 1) or controller 54, 54A. Pads 72 can be urged radially inward and outward by an actuator (not shown), and which can be powered mechanically, by electricity, hydraulics, or pneumatics. In an embodiment, the amount of force $F_B$ exerted onto the shaft 46, 42A, 42B, and which retards the turbine member 36, 36A, 36B, 36C (FIGS. 1-4) is based on the conditions or properties of the flow of fluid F (i.e. pressure, temperature, flowrate, density, viscosity, composition, and the like) sensed downstream of choke assembly 32. Additionally, when the conditions and/or properties of the flow of fluid F downstream of choke assembly 32 reach a designated value, the pads 72 can be moved away from shaft 46, 42A, 42B and so that the turbine member 36 may freely spin within its chamber 37.

An alternative example of a portion of brake system 56, 56A, 56B is shown in a side view in FIG. 5B. In this example, shaft 46, 42A, 42B is surrounded by a coil 74 which is selectively energized by a power source 76. Power source 76 can provide direct or alternating current and connects to coil 74 via lines 78, 80. Additionally, magnets 82, 84 can optionally be provided within the shaft 46, 42A, 42B and which helps to provide a counteracting magnetic field thereby imparting a retarding or slowing force onto the shaft 46, 42A, 42B with activation of coil 74.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A wellhead assembly for producing fluid from a wellbore comprising:
   a production tree having production piping that selectively contains a flow of the fluid; and
   a choke assembly comprising,
      a braking system comprising a caliper system having a pad that selectively and directly engages a shaft with a force that retards rotation of the shaft, and
      a turbine member disposed in a path of the flow of fluid and coupled with the shaft.

2. The wellhead assembly of claim 1, further comprising a generator coupled with the shaft, and wherein the generator is disposed between the braking system and the turbine member.

3. The wellhead assembly of claim 2, further comprising an electrical load in electrical communication with the generator.

4. The wellhead assembly of claim 3, wherein the electrical load comprises a device selected from the group consisting of a light, a gauge, a detector, and a flowmeter.

5. The wellhead assembly of claim 1, wherein the shaft comprises a first shaft, and wherein the turbine member is mounted to a second shaft, wherein gears are attached to ends of the first and second shafts that are meshed with one another, and wherein the first and second shafts are generally perpendicular to one another.

6. The wellhead assembly of claim 1, wherein a magnitude of the force varies and is dependent on a designated pressure drop created in the flow of the fluid by the turbine member.

7. The wellhead assembly of claim 1, wherein the braking system is responsive to pressure in the production piping.

8. The wellhead assembly of claim 7, further comprising a pressure sensor in pressure communication with the production piping at a location downstream of the choke assembly, and which is in signal communication with the braking system.

9. The wellhead assembly of claim 1, wherein the turbine member comprises a hub that is generally coaxial with the production piping and turbine elements that project radially outward from the hub, wherein the turbine elements are arranged about the hub so that lateral edges of each turbine element overlap a leading edge of an adjacent turbine element to define gaps between adjacent turbine elements that are oblique to an axis of the hub.

10. The wellhead assembly of claim 1, wherein the turbine member comprises spaced apart hubs that are each arranged generally parallel with an axis of the production piping, and turbine elements that each span between the hubs and along helical paths.

11. A method of producing fluid from a wellbore comprising:
   directing fluid produced from the wellbore through production piping that is attached to a production tree and across a turbine member coupled to a shaft that are rotated by the fluid;
   generating electricity from rotation of the turbine member;
   monitoring conditions in the production piping; and
   selectively impeding rotation of the turbine member and shaft with a brake system having a pad that directly engages the shaft to selectively impede the rotation, the brake system having a power source that is separate and distinct from the electricity generated by rotation of the turbine member.

12. The method of claim 11, wherein impeding rotation of the turbine member increases a pressure drop in fluid flowing past the turbine member and which regulates fluid flow through the production piping.

13. The method of claim 11, wherein the electricity generated with the rotation of the turbine member is used to power devices adjacent an opening of the wellbore.

14. The method of claim 11, wherein rotation of the turbine member is impeded by an amount that is based on fluid pressure which is measured downstream of the turbine member.

15. A choke assembly for regulating flow from a wellbore comprising:
   a housing having a chamber that receives a flow of fluid from the wellbore;
   a turbine member and a shaft in the chamber that rotate in response to the flow of fluid in the chamber;
   a generator coupled with the turbine member and that generates electricity in response to rotation of the turbine member; and
   a braking system having a pad in selective direct coupling with the shaft to selectively impede the rotation, the braking system having a power source that is separate and distinct from the generator.

16. The choke assembly of claim 15, wherein the braking system pad comprises calipers that selectively directly engage and impart a retarding force to the shaft coupled with the turbine member.

17. The choke assembly of claim 16, further comprising a pressure sensor in production piping downstream of the chamber and that is in communication with the braking system.

18. The choke assembly of claim 15, wherein the turbine member comprises generally planar hubs that are spaced apart from one another and each are rotatable about an axis that is substantially perpendicular with a direction of the flow of fluid, and elongated helically shaped turbine elements that span between the hubs.

19. The choke assembly of claim 15, wherein the generator is disposed between the braking system and the turbine member.

\* \* \* \* \*